United States Patent
Lee et al.

(10) Patent No.: US 10,493,661 B2
(45) Date of Patent: Dec. 3, 2019

(54) IMPROVING THE PURITY OF MATERIALS RECYCLED FROM DISPOSABLE ABSORBENT ARTICLES

(71) Applicant: KIMBERLY-CLARK WORLDWIDE, INC., Neenah, WI (US)

(72) Inventors: HoSun Lee, Songpa-gu (KR); KyungShin Kim, Seocho-gu (KR); HyungByum Kim, Yongin-si (KR)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 57 days.

(21) Appl. No.: 15/751,338

(22) PCT Filed: Aug. 31, 2015

(86) PCT No.: PCT/US2015/047736
§ 371 (c)(1),
(2) Date: Feb. 8, 2018

(87) PCT Pub. No.: WO2017/039615
PCT Pub. Date: Mar. 9, 2017

(65) Prior Publication Data
US 2018/0236692 A1    Aug. 23, 2018

(51) Int. Cl.
B29B 17/02 (2006.01)
B29B 17/04 (2006.01)
B09B 3/00 (2006.01)
C08J 11/08 (2006.01)
B29L 31/48 (2006.01)
B29K 1/00 (2006.01)

(52) U.S. Cl.
CPC ............ *B29B 17/02* (2013.01); *B09B 3/0016* (2013.01); *B29B 17/04* (2013.01); *C08J 11/08* (2013.01); *B29B 2017/0251* (2013.01); *B29K 2001/08* (2013.01); *B29L 2031/4878* (2013.01); *C08J 2300/14* (2013.01); *Y02W 30/622* (2015.05)

(58) Field of Classification Search
CPC . B29B 17/02; B29B 2017/0251; B29B 17/04; C08J 11/08; C08J 2300/14; B09B 3/0016; B29K 2001/08; Y02W 30/622; B29L 2031/4878
See application file for complete search history.

(56) References Cited

U.S. PATENT DOCUMENTS

| | | |
|---|---|---|
| 3,764,475 A | 10/1973 | Kostick |
| 4,009,313 A | 2/1977 | Crawford |
| 4,220,721 A | 9/1980 | Emert |
| 4,628,029 A | 12/1986 | Eveleigh |
| 4,861,721 A | 8/1989 | Waterbury |
| 4,944,734 A | 7/1990 | Wallach |
| 5,292,075 A | 3/1994 | Bartlett |
| 5,326,477 A | 7/1994 | Fugua |
| 5,709,796 A | 1/1998 | Fuqua |
| 5,843,764 A | 12/1998 | Woodward |
| 7,282,113 B2 | 10/2007 | Elgarhy |
| 7,306,697 B2 | 12/2007 | Kikushima |
| 7,662,347 B2 | 2/2010 | Heidel |
| 7,910,688 B2 | 3/2011 | Tian |
| 7,932,065 B2 | 4/2011 | Medoff |
| 7,977,531 B2 | 7/2011 | Dodge, II |
| 8,177,151 B2 | 5/2012 | Grimes |
| 8,436,058 B2 | 5/2013 | Grimes |
| 8,580,541 B2 | 11/2013 | Yang |
| 2009/0191408 A1 | 7/2009 | Tian |
| 2009/0192481 A1 | 7/2009 | Dodge, II |
| 2009/0326497 A1 | 12/2009 | Schmidt |
| 2010/0292401 A1 | 11/2010 | Grimes |
| 2014/0024561 A1 | 1/2014 | Reddy |
| 2014/0370551 A1 | 12/2014 | Retsina |

FOREIGN PATENT DOCUMENTS

| | | |
|---|---|---|
| CN | 1467248 A | 1/2004 |
| CN | 101453987 A | 6/2009 |
| DE | 4409334 A1 | 9/1994 |
| DE | 19853520 C2 | 5/2001 |
| EP | 0525708 A1 | 2/1993 |
| JP | 2000246011 A2 | 9/2000 |
| JP | 2003225645 A2 | 8/2003 |
| JP | 2003300051 A2 | 10/2003 |
| JP | 2009062662 A2 | 3/2009 |
| JP | 2009119456 A | 6/2009 |
| JP | 2010260012 A2 | 11/2010 |
| JP | 4685973 B1 | 5/2011 |
| JP | 2011120962 A | 6/2011 |
| JP | 2013202021 A2 | 10/2013 |
| JP | 2014217835 A2 | 11/2014 |
| KR | 1020110029724 A | 3/2011 |
| KR | 101044439 B1 | 6/2011 |
| KR | 101173154 B1 | 8/2012 |
| KR | 1020150034250 A | 4/2015 |
| WO | 9207995 A1 | 5/1992 |
| WO | 9524967 A1 | 9/1995 |
| WO | 9924168 A1 | 5/1999 |
| WO | 09060893 A1 | 5/2009 |
| WO | 09081124 A2 | 7/2009 |
| WO | 14077619 A1 | 5/2014 |
| WO | 14203922 A1 | 12/2014 |

*Primary Examiner* — Rabon A Sergent
(74) *Attorney, Agent, or Firm* — Kimberly-Clark Worldwide, Inc.

(57) ABSTRACT

Improving the recovery from recycling a disposable absorbent article including superabsorbent polymer includes separating the article into a mixed polymeric material/cellulosic fiber stream and a superabsorbent polymer/fibers stream; and processing the mixed polymeric material/cellulosic fiber stream using an enzyme to release the cellulosic fibers from the polymeric materials. The method can also include shredding the disposable absorbent article; re-pulping the shredded disposable absorbent article; and dehydrating the superabsorbent polymer, wherein dehydrating includes belching fluid from swollen superabsorbent polymers (SAPs) by immersing swollen SAP in a gel state into a composition for removing moisture, wherein seawater and 0.5 to 3% by weight of calcium chloride based on the weight of seawater are mixed for 10 minutes to 4 hours.

20 Claims, 1 Drawing Sheet

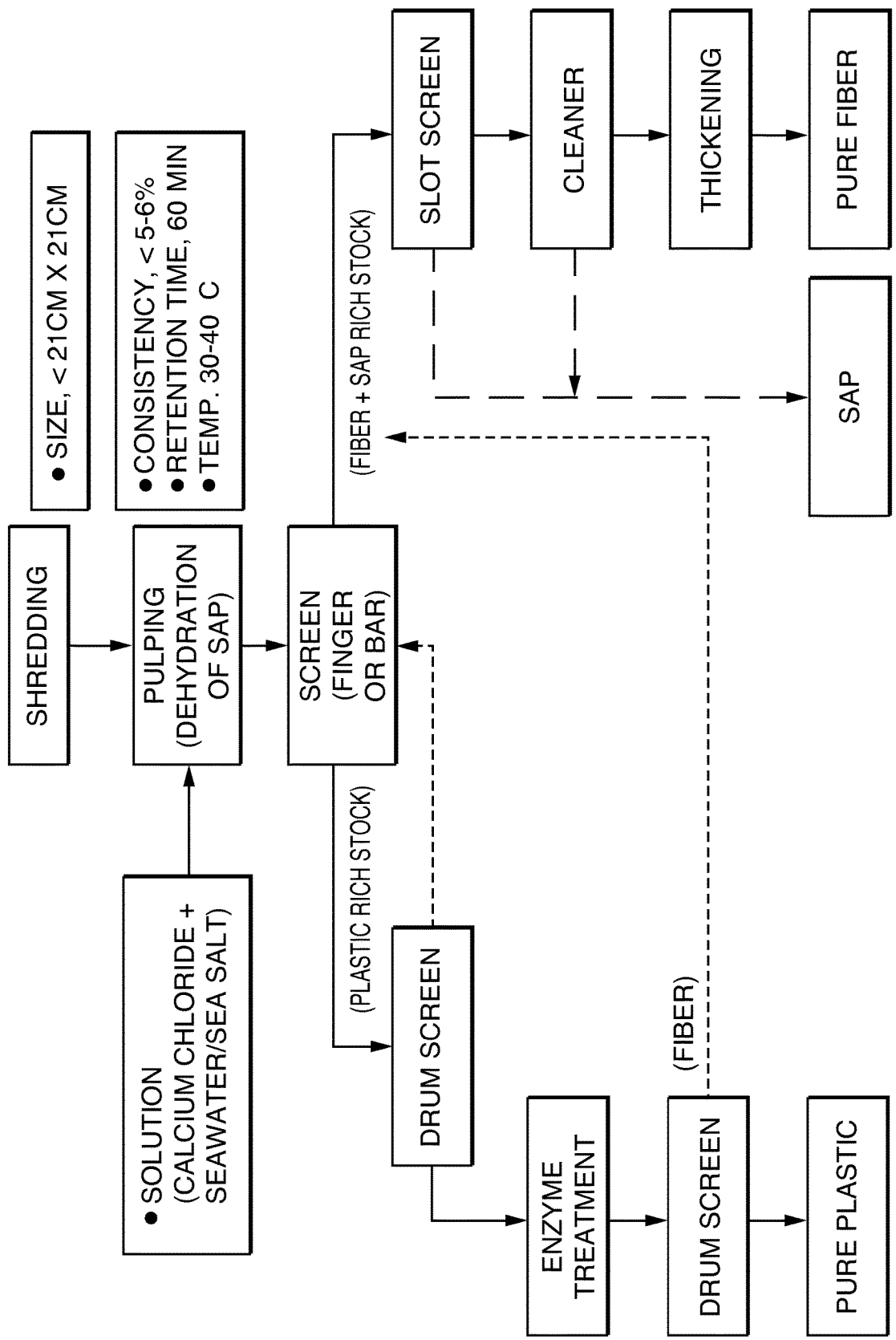

IMPROVING THE PURITY OF MATERIALS RECYCLED FROM DISPOSABLE ABSORBENT ARTICLES

BACKGROUND

The present disclosure relates to methods for improving the purity and quantity of materials, including synthetic materials, recovered from recycling disposable absorbent articles. More specifically, the present disclosure relates to methods for easily and economically separating the materials in a disposable absorbent article, removing fluid absorbed by superabsorbent polymers (SAP), and recovering the constituent materials such as polymer, cellulosic fibers, and superabsorbent polymer.

There has been an increasing use of disposable absorbent articles including diapers each year. Currently, all the used disposable absorbent articles are incinerated or disposed in a landfill. However, incinerating or disposing the articles in a landfill can result in the problems of lack of landfill sites or problems due to incineration that results in high processing cost and adversely affects the environment due to carbon dioxide produced during the process.

Further, because large quantities of materials (resources) are consumed for manufacturing disposable absorbent articles relative to the purpose of treating human waste, there has been an increasing demand for recycling or reusing disposable absorbent articles. Thus, there is a need for efficient and economical processes for recycling used disposable absorbent articles into individual constituents by decomposing or isolating main constituents of the absorbent articles without harming the environment. In general, disposable absorbent articles, such as baby diapers, consist of polypropylene (PP), polyethylene (PE), superabsorbent polymer (SAP), cellulose pulp, and the like.

Previous attempts involved the use of harmful chemicals, and resulted in the disposal of useful materials due to inefficient recovery techniques. It is particularly difficult to separate cellulosic fibers from polymers layers due to the use of adhesives. It is also difficult to process absorbent material that has been prepared by mechanically mixing superabsorbent polymers and cellulose pulp in a uniform distribution having a certain arrangement. Such material cannot be isolated into individual materials mechanically or by other physical measures, because superabsorbent polymers become a gel state as they absorb moisture from human waste to be swollen (i.e., become larger in volume) and are tangled with cellulose pulp fibers.

SUMMARY

As a result, a method is needed to reduce the number and amount of harmful chemicals used in recycling, and to improve the purity and quantity of materials recovered from the disposable absorbent articles being recycled. The present disclosure presents a means to solve the problems of conventional techniques as described above, including methods for economically and easily removing moisture absorbed by a superabsorbent polymer, capable of absorbing an amount of moisture equivalent to a hundred times its own weight, once it has been used for its intended purpose.

The present disclosure provides a method for improving the recovery from recycling a disposable absorbent article including superabsorbent polymer, the method including separating the article into a mixed polymeric material/cellulosic fiber stream and a superabsorbent polymer/fibers stream; and processing the mixed polymeric material/cellulosic fiber stream using an enzyme to release the cellulosic fibers from the polymeric materials.

The present disclosure also provides a method for improving the recovery from recycling a disposable absorbent article including superabsorbent polymer, the method including shredding the disposable absorbent article; re-pulping the shredded disposable absorbent article; and dehydrating the superabsorbent polymer, wherein dehydrating includes belching fluid from swollen superabsorbent polymers (SAPs) by immersing swollen SAP in a gel state into a composition for removing moisture, wherein seawater and 0.5 to 3% by weight of calcium chloride based on the weight of seawater are mixed for 10 minutes to 4 hours. The method also includes separating the pulped and shredded disposable absorbent article into a mixed polymeric material/cellulosic fiber stream and a superabsorbent polymer/fibers stream; and processing the mixed polymeric material/cellulosic fiber stream using an enzyme to release the cellulosic fibers from the polymeric materials.

The present disclosure further provides a method for improving the recovery from recycling a disposable absorbent article including superabsorbent polymer, the method including shredding the disposable absorbent article; re-pulping the shredded disposable absorbent article; and dehydrating the superabsorbent polymer. The method also includes separating the pulped and shredded disposable absorbent article into a mixed polymeric material/cellulosic fiber stream and a superabsorbent polymer/fibers stream; processing the mixed polymeric material/cellulosic fiber stream using an enzyme to release the cellulosic fibers from the polymeric materials, wherein the enzyme is cellulase; and transferring cellulosic fiber separated from the mixed polymeric material/cellulosic fiber stream to the superabsorbent polymer/fibers stream.

According to the methods of the present disclosure, it is possible to easily and economically recover materials from disposable absorbent articles with high efficiency.

Further, the methods of the present application can be advantageously used for recycling disposable absorbent articles including an absorbent consisting of superabsorbent polymer and cellulose pulp, which have been difficult to isolate into individual resources by means of conventional chemical processes after being used for human waste purposes.

BRIEF DESCRIPTION OF THE DRAWINGS

The present disclosure will be more fully understood, and further features will become apparent, when reference is made to the following detailed description and the accompanying drawings. The drawings are merely representative and are not intended to limit the scope of the claims.

FIG. 1 is a flowchart illustrating the material recovery methods described herein.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

The present disclosure relates to methods for improving the purity and quantity of materials, including synthetic materials, recovered from recycling disposable absorbent articles.

More specifically, the present disclosure relates to methods for easily and economically separating the materials in a disposable absorbent article, removing fluid absorbed by superabsorbent polymers (SAP), and recovering the constituent materials such as polymer, cellulosic fibers, and superabsorbent polymer.

The objective of the recycling process is to create clean streams of recovered fiber, plastics, and SAP. The residual fibers need to be removed from the plastics stream to be considered a "clean" stream of recovered plastic.

To isolate such superabsorbent polymers in a gel state and cellulose pulp into individual resources, superabsorbent polymers must be converted from a gel state to the original particle or other state by removing moisture absorbed by superabsorbent polymers.

Thus, to recycle used disposable absorbent articles having an absorbent including superabsorbent polymers and cellulose pulp by isolating their constituents into individual materials, a technique is needed to isolate superabsorbent polymers and cellulose pulp into individual materials by allowing moisture absorbed by superabsorbent polymers to be discharged, thereby converting the polymers from a gel state to the original particle or other state.

Previous techniques of recycling used diapers or the like by mechanically crushing and re-extruding into low grade fuels have been attempted, but such techniques are uneconomical, inefficient, potentially harmful, and thus impractical. In a typical process, a disposable absorbent article is shredded and the materials are processed together using acids and other harsh chemicals. Because the entire disposable absorbent article is processed, large amounts of chemicals including enzymes are needed.

Disposable absorbent articles including baby diapers generally consist of lining, absorbent transport layer, absorbent material, waterproof film, leg and waist bands, and the like. In addition to diapers, diaper pants, training pants, youth pants, incontinence articles, feminine care products, and other disposable absorbent articles can include similar structures. In many of these, the absorbent material includes superabsorbent polymer material and cellulose pulp. The functions and actions of each constituent are briefly described below.

The lining directly contacts a user's skin, and is designed to pass human waste toward the absorbent while keeping dry the surface contacting the user's skin. The absorbent transport layer, if present, aids in both passing the waste to the absorbent material and preventing the waste from returning back to the lining. In addition, the absorbent material usually includes cellulose pulp and superabsorbent polymer, which is typically capable of absorbing an amount of moisture equivalent to a hundred times its own weight. The absorbent material can be covered by polypropylene nonwoven fabrics or other suitable material to help maintain its shape. A waterproof film backsheet or outer cover acts to protect clothing and surfaces by preventing waste from leaving the article. A waist band and leg bands, if present, help to prevent waste from leaving the article by providing seals at the edges of the articles. Each structure can be affixed to other structures via physical or chemical bonding means.

In the method described herein and as illustrated in FIG. 1, a disposable absorbent article is first shredded using conventional means. In one particular example, it was found that shredding a disposable absorbent article to a size less than approximately 21 cm by 21 cm, or preferably less than approximately 12 cm by 12 cm, or more preferably less than approximately 6 cm by 6 cm, produced the best results, but this can vary by product and material type.

The shredded disposable absorbent article is then re-pulped or re-slushed in an aqueous solution to assist in separating the materials. In one particular example, it was found that pulping to a consistency less than 5-6% with a retention time of 60 minutes at a temperature between 30 and 40° C. produced the best results, but this can vary by product and material type. Each material of the disposable absorbent article, such as pulp/cellulose, mixed plastic, and SAP, is efficiently separated under the proper separation condition such as shredding size, consistency, time, and temperature in pulping system.

In addition to the pulping process, the addition of the appropriate aqueous solution can promote dehydration of the superabsorbent polymer. The preferred process is described in co-pending U.S. patent application Ser. No. 14/443,246, which is incorporated herein by reference to the extent it does not conflict herewith. Absorptivity of the superabsorbent polymer, one of the constituents of the absorbent material, is a function that increases with increased contact area between solutions to be absorbed and the polymer materials, with increased osmotic pressure due to the difference in ion concentration inside and outside the polymer material, and with increased repulsion between molecular chains in the polymer materials. The absorption is ideally reversible.

Thus, moisture absorbed by polymer materials can be expelled when a new outer environment is created by incorporating a solution for removing moisture that was absorbed in the superabsorbent polymer materials to create an outward osmotic flow from the inside of the polymer materials or to lower the repulsion between molecular chains in the polymer material.

Because superabsorbent polymer materials are conventionally obtained by polymerization of acrylic acid and sodium hydroxide, a sodium ion is contained in superabsorbent polymer molecules. Further, when contacted with moisture including human waste such as urine, artificial urine, or water, sodium ions in the polymer molecules readily dissociate to form a concentration gradient between the inside and outside of the polymer materials, thereby causing an inflow of moisture from outside the polymer materials. On the other hand, if relatively higher concentrations of sodium ions are provided outside the polymer materials, counter-flow is created to belch moisture absorbed by the polymer materials.

Further, intermolecular repulsion between superabsorbent polymer materials is induced by negative charges generated by oxidation of sodium ions included within the polymer molecules, and if an oxidant (e.g., a divalent metal cation) that weakens the repulsion between negative charges is present, the repulsion is weakened to decrease the distance between the molecular chains of the polymers. As a result, the space for retaining moisture becomes narrower such that moisture absorbed in the polymer materials is discharged.

Although a similar effect can also occur when absorbent materials are under a strong acidic environment, such a process might not be an appropriate practical alternative due to the difficulties in handling, odors, etc., of the solutions to be used for recycling.

Superabsorbent polymers (SAPs) to be used in the present disclosure are not particularly limited, but any SAPs generally used in disposable absorbent articles can be used. Further, SAPs are commercially available.

In the present disclosure, swollen superabsorbent polymers in a gel state refer to SAPs in a gel state wherein 40 to 1,000 times of moisture based on their weight are absorbed. To examine their functions, conditions similar to those found in the use of absorbent articles can be obtained by allowing SAPs to absorb moisture such as artificial urine, i.e., 0.9% by weight aqueous NaCl solution (otherwise known as "physiological saline") that is similar to human urine, or urine as real human waste, or distilled water.

In the present disclosure, as the seawater in the composition for removing moisture that is used for belching fluid from swollen superabsorbent polymers in a gel state, natural seawater can be used directly without undergoing further processing or purification, or artificial seawater having a similar composition to that of seawater can be purchased or prepared for use.

Seawater that can be used in the present disclosure can have a salinity (%) of 2.0 to 4.0%, and comprise 1.5 to 3.1% by weight of sodium chloride and 0.4 to 0.8% by weight of alkaline earth metal ions, such as $Mg^{2+}$ and $Ca^{2+}$.

Accordingly, based on seawater having a salinity of 3.5%, seawater comprises about 2.7% by weight of sodium chloride, which is about three times of the salinity of urine (0.9% by weight), and thus, if swollen SAPs in a gel state are immersed into an aqueous solution containing seawater, the solution serves to generate an osmotic flow from the inside to the outside of the SAP materials. Furthermore, alkaline earth metal ions, such as $Mg^{2+}$ and $Ca^{2+}$, contained in seawater interact with an anion within the swollen SAP materials in a gel state to lower the repulsion between SAP molecules. Thus, the effect of expelling moisture absorbed by the SAPs outside the molecules is further increased.

Calcium chloride used in a composition for removing moisture according to the present disclosure is easy to handle, readily available at low cost, has little toxicity or odor, and primarily exist as ions in an aqueous solution due to its very high degree of ionization. Commercially available calcium chloride having a purity of 74 to 99% by weight can be used as is without purification. When removing fluid absorbed by SAPs, using in the seawater a composition obtained by adding 0.5 to 3% by weight of calcium chloride based on the weight of seawater provides an effect of further increasing $Ca^{2+}$ concentration in addition to $Ca^{2+}$ ions contained in seawater itself. This further lowers the repulsion between anions within SAPs in a gel state, thereby making it possible to more efficiently discharge moisture absorbed by SAPs.

The aqueous solution containing seawater and calcium chloride can have a pH in a range of 7.0 to 8.0, which is desirable because the efficiency of belching fluid from swollen superabsorbent polymers in a gel state is high within this range.

Thus, according to the methods of the present disclosure wherein swollen superabsorbent polymers in a gel state are immersed into a mixed aqueous solution comprising natural seawater that is readily available without further processing or purification and calcium chloride that is available at low cost and has little toxicity or smell, it is possible to easily and economically remove moisture absorbed by superabsorbent polymers at a high substitution rate of 80 to 90%.

Following pulping of the shredded disposable absorbent article and dehydration of the SAP, the mixture is separated into two streams using a screen system employing fingers, bars, or any other suitable screen system. The mixture is separated into a plastic-rich stock including primarily polymer materials with fibers adhesively attached, and fiber- and SAP-rich stock including primarily free fibers and dehydrated SAP. If used disposable absorbent articles are being processed, any human waste present in the original articles can also be removed from the streams at this or any suitable point and sent to wastewater treatment for further processing (not shown).

It should be noted that additional screening, separation, and thickening processes can be employed at any stage if desired to remove and separate other materials or products, depending on the nature of the source disposable absorbent articles and the destination of and requirements for the output materials.

The plastic rich stock or mixed polymeric material/cellulosic fiber stream is further refined using, for example, a drum screen. Free fibers are returned to the previous separation screen to be entrained in the superabsorbent polymer/fibers stream.

The remainder of the mixed polymeric material/cellulosic fiber stream is treated with an enzyme to release the fibers from the polymeric material. Although any suitable enzyme can be used, environmentally-friendly cellulase is preferred. An additional screening following the enzymatic treatment using a drum screen or any other suitable screen separates the remaining free fibers and returns them to the superabsorbent polymer/fibers stream. The remainder of what was initially the mixed polymeric material/cellulosic fiber stream is almost entirely polymeric material. This output material can also be sterilized by heating or any suitable method (not shown), particularly if the source articles are used disposable absorbent articles. Experimentation showed that such treatment with cellulase following the separation, dehydration, and screening processes improves the purity of the final polymer stream from 6.2% residual fibers to 0.1% residual fiber, yielding essentially pure plastic for future use.

The superabsorbent polymer/fibers stream, with the additions of free fibers from both screenings of the mixed polymeric material/cellulosic fiber stream, is then screened using a slot screen or any other suitable screening method to remove dehydrated SAP. The superabsorbent polymer/fibers stream is then sent through a cleaner that removes virtually all of the remaining dehydrated SAP, which is added to the SAP removed in the previous screening step. The two SAP streams are combined to output a stream of dehydrated SAP for future use. This output material can also be sterilized by heating or any suitable method (not shown), particularly if the source articles are used disposable absorbent articles. The remainder of what was initially the superabsorbent polymer/fibers stream is almost entirely fiber material, with the result being a stream of essentially pure fiber for future use.

As a result, this recycling process recovers virtually all of the original materials for future use. Materials are now recovered and not disposed of as in previous processes, and the use of acids and other hazardous materials is minimized.

The methods according to the present disclosure can be advantageously used as an environmentally-friendly and economical means to recycle disposable absorbent articles such as diapers that include an absorbent core having SAP and cellulose pulp, even after the article has been used for absorption.

A primary improvement in the process described herein over previous attempts is the dehydration and removal of SAP prior to the enzymatic treatment. Otherwise, the pH control of the enzyme reaction is very difficult due to the buffering effect from calcium-substituted SAP.

An additional improvement is the use of an environmentally-friendly enzyme such as cellulase to release residual cellulosic fibers that are attached to synthetic polymeric (PE/PP plastics) materials. The use of such enzymes displaces the use strong acids or other harsh chemicals to release residual fibers.

In a first particular aspect, a method for improving the recovery from recycling a disposable absorbent article including superabsorbent polymer includes separating the article into a mixed polymeric material/cellulosic fiber stream and a superabsorbent polymer/fibers stream; and processing the mixed polymeric material/cellulosic fiber stream using an enzyme to release the cellulosic fibers from the polymeric materials.

A second particular aspect includes the first particular aspect, wherein the disposable absorbent article is a post-use absorbent article.

A third particular aspect includes the first and/or second aspect, further including shredding the disposable absorbent article prior to separating.

A fourth particular aspect includes one or more of aspects 1-3, further comprising re-pulping the shredded disposable absorbent article.

A fifth particular aspect includes one or more of aspects 1-4, further comprising dehydrating the superabsorbent polymer.

A sixth particular aspect includes one or more of aspects 1-5, wherein dehydrating uses seawater or an ionic equivalent of seawater.

A seventh particular aspect includes one or more of aspects 1-6, wherein dehydrating includes belching fluid from swollen superabsorbent polymers (SAPs) by immersing swollen SAP in a gel state into a composition for removing moisture, wherein seawater and 0.5 to 3% by weight of calcium chloride based on the weight of seawater are mixed for 10 minutes to 4 hours.

An eighth particular aspect includes one or more of aspects 1-7, wherein the enzyme is cellulase.

A ninth particular aspect includes one or more of aspects 1-8, wherein the disposable absorbent article is a diaper.

A tenth particular aspect includes one or more of aspects 1-9, further comprising transferring cellulosic fiber separated from the mixed polymeric material/cellulosic fiber stream to the superabsorbent polymer/fibers stream.

An eleventh particular aspect includes one or more of aspects 1-10, wherein the separating is performed before the processing.

In a twelfth particular aspect, a method for improving the recovery from recycling a disposable absorbent article including superabsorbent polymer includes shredding the disposable absorbent article; re-pulping the shredded disposable absorbent article; and dehydrating the superabsorbent polymer, wherein dehydrating includes belching fluid from swollen superabsorbent polymers (SAPs) by immersing swollen SAP in a gel state into a composition for removing moisture, wherein seawater and 0.5 to 3% by weight of calcium chloride based on the weight of seawater are mixed for 10 minutes to 4 hours. The method also includes separating the pulped and shredded disposable absorbent article into a mixed polymeric material/cellulosic fiber stream and a superabsorbent polymer/fibers stream; and processing the mixed polymeric material/cellulosic fiber stream using an enzyme to release the cellulosic fibers from the polymeric materials.

A thirteenth particular aspect includes the twelfth particular aspect, wherein the enzyme is cellulase.

A fourteenth particular aspect includes the twelfth and/or thirteenth particular aspects, wherein the disposable absorbent article is a diaper.

A fifteenth particular aspect includes one or more of aspects 12-14, wherein the disposable absorbent article is a post-use absorbent article.

A sixteenth particular aspect includes one or more of aspects 12-15, further comprising transferring cellulosic fiber separated from the mixed polymeric material/cellulosic fiber stream to the superabsorbent polymer/fibers stream.

In a seventeenth particular aspect, a method for improving the recovery from recycling a disposable absorbent article including superabsorbent polymer includes shredding the disposable absorbent article; re-pulping the shredded disposable absorbent article; and dehydrating the superabsorbent polymer. The method also includes separating the pulped and shredded disposable absorbent article into a mixed polymeric material/cellulosic fiber stream and a superabsorbent polymer/fibers stream; processing the mixed polymeric material/cellulosic fiber stream using an enzyme to release the cellulosic fibers from the polymeric materials, wherein the enzyme is cellulase; and transferring cellulosic fiber separated from the mixed polymeric material/cellulosic fiber stream to the superabsorbent polymer/fibers stream.

An eighteenth particular aspect includes the seventeenth particular aspect, wherein the disposable absorbent article is a diaper.

A nineteenth particular aspect includes the seventeenth and/or eighteenth particular aspects, wherein the disposable absorbent article is a post-use absorbent article.

In a twentieth particular aspect includes one or more of aspects 17-19, wherein dehydrating includes belching fluid from swollen superabsorbent polymers (SAPs) by immersing swollen SAP in a gel state into a composition for removing moisture, wherein seawater and 0.5 to 3% by weight of calcium chloride based on the weight of seawater are mixed for 10 minutes to 4 hours.

While the disclosure has been described in detail with respect to the specific aspects thereof, it will be appreciated that those skilled in the art, upon attaining an understanding of the foregoing, can readily conceive of alterations to, variations of, and equivalents to these aspects. Accordingly, the scope of the present disclosure should be assessed as that of the appended claims and any equivalents thereto.

What is claimed is:

1. A method for improving the recovery from recycling a disposable absorbent article including superabsorbent polymer, the method comprising:
    separating the article into a plastic-rich mixed polymeric material/cellulosic fiber stream and a superabsorbent polymer/fibers stream; and
    processing the plastic-rich mixed polymeric material/cellulosic fiber stream using an enzyme to release the cellulosic fibers from the plastic-rich mixed polymeric materials.

2. The method of claim 1, wherein the disposable absorbent article is a post-use absorbent article.

3. The method of claim 1, further comprising shredding the disposable absorbent article prior to separating.

4. The method of claim 3, further comprising re-pulping the shredded disposable absorbent article.

5. The method of claim 1, further comprising dehydrating the superabsorbent polymer.

6. The method of claim 5, wherein dehydrating uses sea water or an ionic equivalent of seawater.

7. The method of claim 5, wherein dehydrating includes belching water from swollen superabsorbent polymers (SAPs) by immersing swollen SAP in a gel state into a composition for removing moisture, wherein sea water and 0.5 to 3% by weight of calcium chloride based on the weight of sea water are mixed for 10 minutes to 4 hours.

8. The method of claim 1, wherein the enzyme is cellulase.

9. The method of claim 1, wherein the disposable absorbent article is a diaper.

10. The method of claim 1, further comprising transferring cellulosic fiber released from the plastic-rich mixed polymeric material/cellulosic fiber stream to the superabsorbent polymer/fibers stream.

11. The method of claim 1, wherein the separating is performed before the processing.

12. A method for improving the recovery from recycling a disposable absorbent article including superabsorbent polymer, the method comprising:
   shredding the disposable absorbent article;
   re-pulping the shredded disposable absorbent article;
   dehydrating the superabsorbent polymer, wherein dehydrating includes belching water from swollen superabsorbent polymers (SAPs) by immersing swollen SAP in a gel state into a composition for removing moisture, wherein sea water and 0.5 to 3% by weight of calcium chloride based on the weight of sea water are mixed for 10 minutes to 4 hours;
   separating the pulped and shredded disposable absorbent article into a plastic-rich mixed polymeric material/cellulosic fiber stream and a superabsorbent polymer/fibers stream; and
   processing the plastic-rich mixed polymeric material/cellulosic fiber stream using an enzyme to release the cellulosic fibers from the plastic-rich mixed polymeric materials.

13. The method of claim 12, wherein the enzyme is cellulase.

14. The method of claim 12, wherein the disposable absorbent article is a diaper.

15. The method of claim 12, wherein the disposable absorbent article is a post-use absorbent article.

16. The method of claim 12, further comprising transferring cellulosic fiber released from the plastic-rich mixed polymeric material/cellulosic fiber stream to the superabsorbent polymer/fibers stream.

17. A method for improving the recovery from recycling a disposable absorbent article including superabsorbent polymer, the method comprising:
   shredding the disposable absorbent article;
   re-pulping the shredded disposable absorbent article;
   dehydrating the superabsorbent polymer;
   separating the pulped and shredded disposable absorbent article into a plastic-rich mixed polymeric material/cellulosic fiber stream and a superabsorbent polymer/fibers stream;
   processing the plastic-rich mixed polymeric material/cellulosic fiber stream using an enzyme to release the cellulosic fibers from the plastic-rich mixed polymeric materials, wherein the enzyme is cellulase; and
   transferring cellulosic fiber released from the plastic-rich mixed polymeric material/cellulosic fiber stream to the superabsorbent polymer/fibers stream.

18. The method of claim 17, wherein the disposable absorbent article is a diaper.

19. The method of claim 17, wherein the disposable absorbent article is a post-use absorbent article.

20. The method of claim 17, wherein dehydrating includes belching water from swollen superabsorbent polymers (SAPs) by immersing swollen SAP in a gel state into a composition for removing moisture, wherein sea water and 0.5 to 3% by weight of calcium chloride based on the weight of sea water are mixed for 10 minutes to 4 hours.

* * * * *